(12) United States Patent
Radenbaugh et al.

(10) Patent No.: US 11,338,873 B2
(45) Date of Patent: May 24, 2022

(54) FRAME FOR AN ELECTRIC CARGO BICYCLE

(71) Applicant: Rad Power Bikes Inc., Seattle, WA (US)

(72) Inventors: Mike Radenbaugh, Seattle, WA (US); Taubon Djamtorki, Seattle, WA (US); Joe Gray, Seattle, WA (US)

(73) Assignee: RAD POWER BIKES INC., Seattle, WA (US)

( * ) Notice: Subject to any disclaimer, the term of this patent is extended or adjusted under 35 U.S.C. 154(b) by 93 days.

(21) Appl. No.: 16/872,059

(22) Filed: May 11, 2020

(65) Prior Publication Data

US 2021/0347428 A1 Nov. 11, 2021

(51) Int. Cl.
*B62J 7/04* (2006.01)
*B62M 9/00* (2006.01)
*B62M 6/40* (2010.01)
*B62K 5/00* (2013.01)

(52) U.S. Cl.
CPC ........ *B62J 7/04* (2013.01); *B62K 5/00* (2013.01); *B62M 6/40* (2013.01); *B62M 9/00* (2013.01)

(58) Field of Classification Search
CPC ..... B62J 7/04; B62J 25/04; B62J 25/06; B62J 25/08; B62K 5/00; B62K 7/04; B62M 6/40; B62M 9/00
See application file for complete search history.

(56) References Cited

U.S. PATENT DOCUMENTS

| 3,873,127 | A | * | 3/1975 | McNichol, Jr. | ............ B62J 1/14 280/202 |
| 4,295,586 | A | * | 10/1981 | Shockley | ............ B62J 9/27 224/430 |
| 4,433,802 | A | * | 2/1984 | Woolf | ............ B62J 9/23 224/153 |
| 5,667,117 | A | * | 9/1997 | Nutto | ............ B62J 9/27 224/417 |
| 6,092,820 | A | | 7/2000 | Evans | |
| 10,377,438 | B2 | * | 8/2019 | Prommel | ............ B62J 7/08 |
| 10,988,206 | B1 | * | 4/2021 | Chang | ............ B62M 6/60 |
| 11,178,957 | B2 | * | 11/2021 | Steele | ............ A45F 3/08 |

(Continued)

FOREIGN PATENT DOCUMENTS

| KR | 101521347 B1 | 5/2015 |
| WO | 2017144024 A1 | 8/2017 |

OTHER PUBLICATIONS

International Search Report and Written Opinion dated Aug. 20, 2021 for related International Patent Application No. PCT/US2021/030683.

(Continued)

*Primary Examiner* — Kevin Hurley
*Assistant Examiner* — Marlon A Arce
(74) *Attorney, Agent, or Firm* — AMPACC Law Group, PLLC

(57) ABSTRACT

A frame for an electric bicycle, such as a long-tail electric cargo bicycle, is described. The bike frame, in some embodiments, includes cross members that connect a rear rack of the bicycle to a head tube of the bicycle via a seat tube of the bicycle. Via the multiple connection points, the cross members mitigate side to side movement, such as waggling, of the rear rack of the bicycle.

19 Claims, 12 Drawing Sheets

(56) References Cited

U.S. PATENT DOCUMENTS

| | | | |
|---|---|---|---|
| 2004/0046352 A1* | 3/2004 | Vroomen | B62K 19/06 |
| | | | 280/274 |
| 2005/0058727 A1 | 3/2005 | Ockenden et al. | |
| 2006/0076380 A1 | 4/2006 | Ockenden et al. | |
| 2015/0203166 A1* | 7/2015 | Kitchen | B62J 7/04 |
| | | | 280/7.1 |

OTHER PUBLICATIONS www.ternbicycles.com/bikes/gsd (Mar. 14, 2019).

* cited by examiner

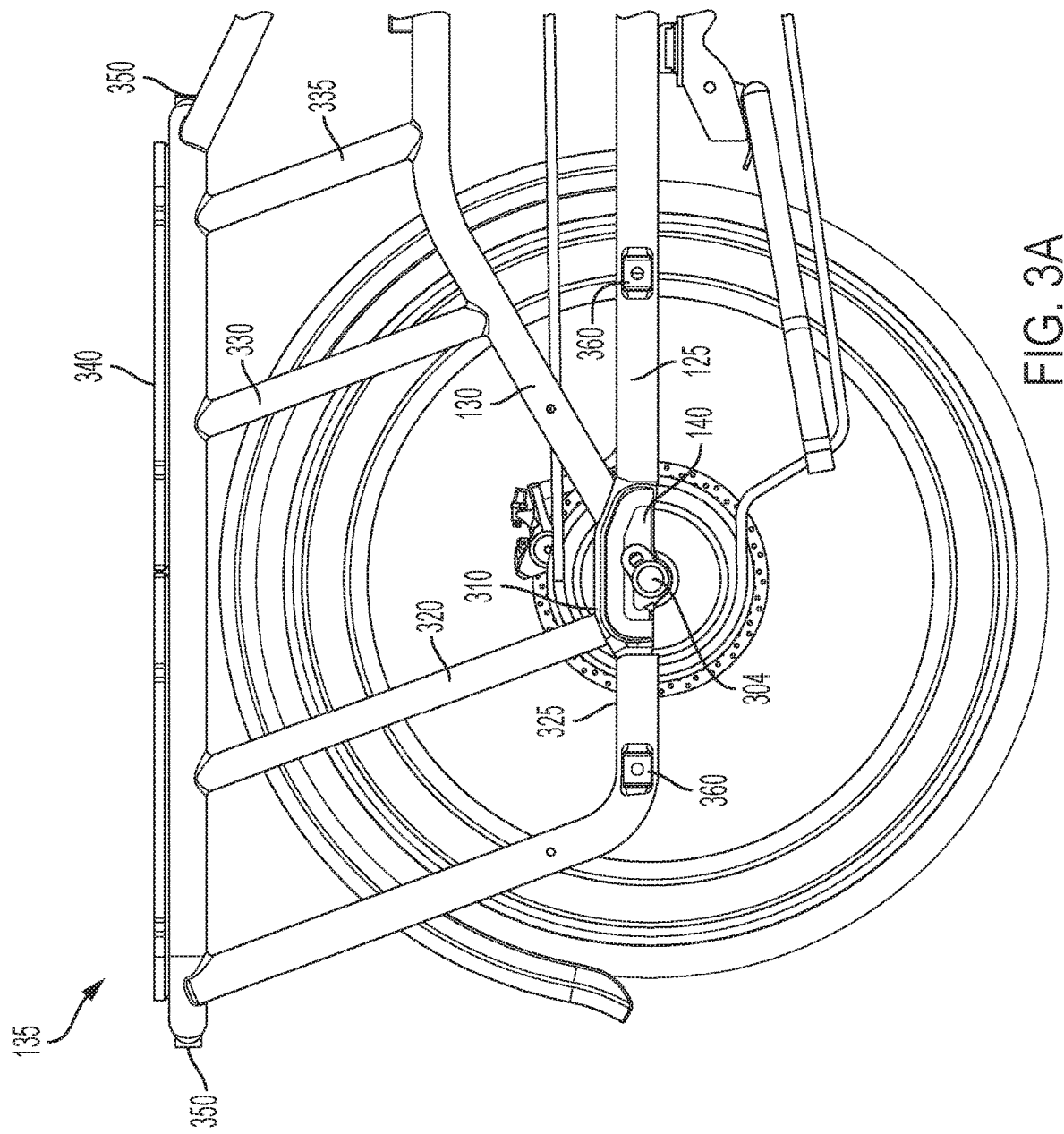

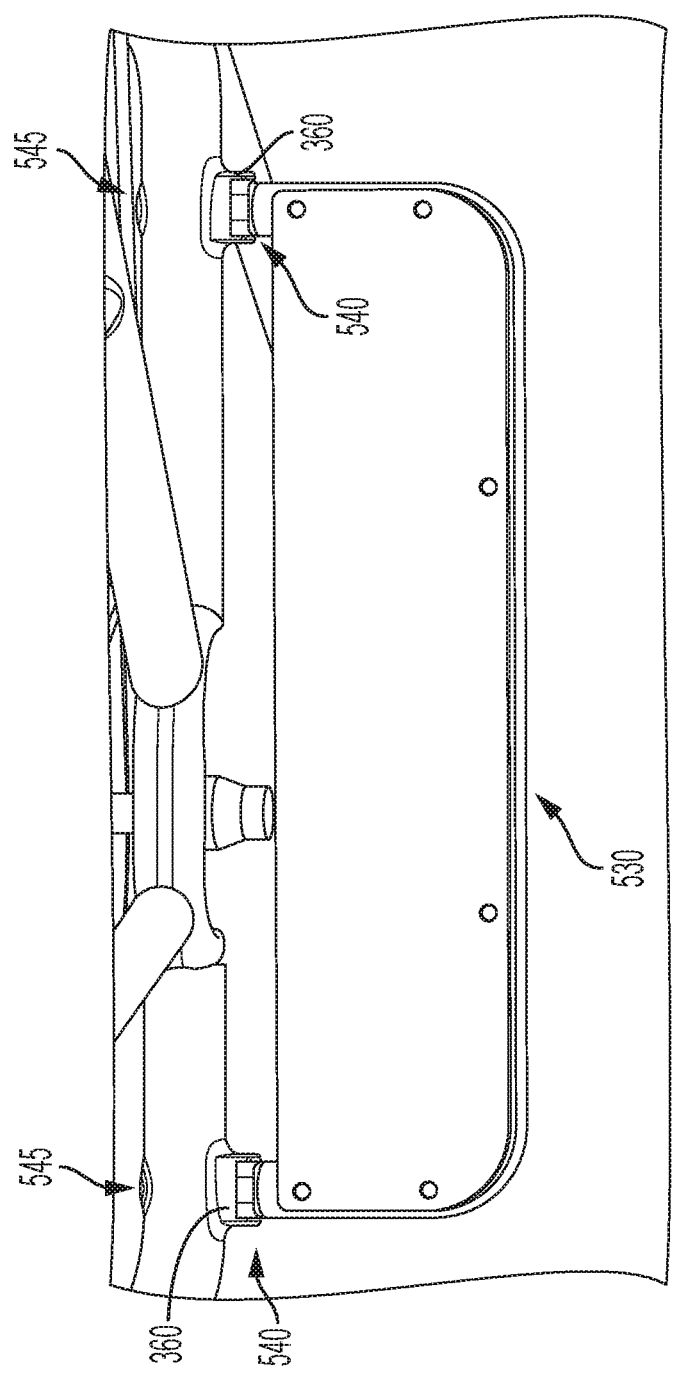

FRAME FOR AN ELECTRIC CARGO BICYCLE

BACKGROUND

Cargo bicycles are popular vehicles to transport children or goods via a bicycle. Electric cargo bicycles, especially, enable riders to transport relatively heavy loads (e.g., multiple children or heavy cargo) over long distances and across various types of terrain, such as hilly or rough terrain. Thus, electric cargo bicycles can be used in a variety of ways—as family transport vehicles, as micro-mobility vehicles, and/or as a replacement for an automobile or other motorized vehicle.

Because of their adaptability, cargo bikes should be designed to withstand heavy and varied loads and accommodate different uses, without certain drawbacks typical of conventional cargo bikes, such as drawbacks associated with the weight of the bike, the lack of adaptable features or configurations, and others.

BRIEF DESCRIPTION OF THE DRAWINGS

Embodiments of the present technology will be described and explained through the use of the accompanying drawings.

FIG. 3A is a front view of a rear portion of the bike frame of the electric cargo bike.

FIG. 5C is a closeup view of flexible mounting points of the bike frame of the electric cargo bike.

Figure 1A:
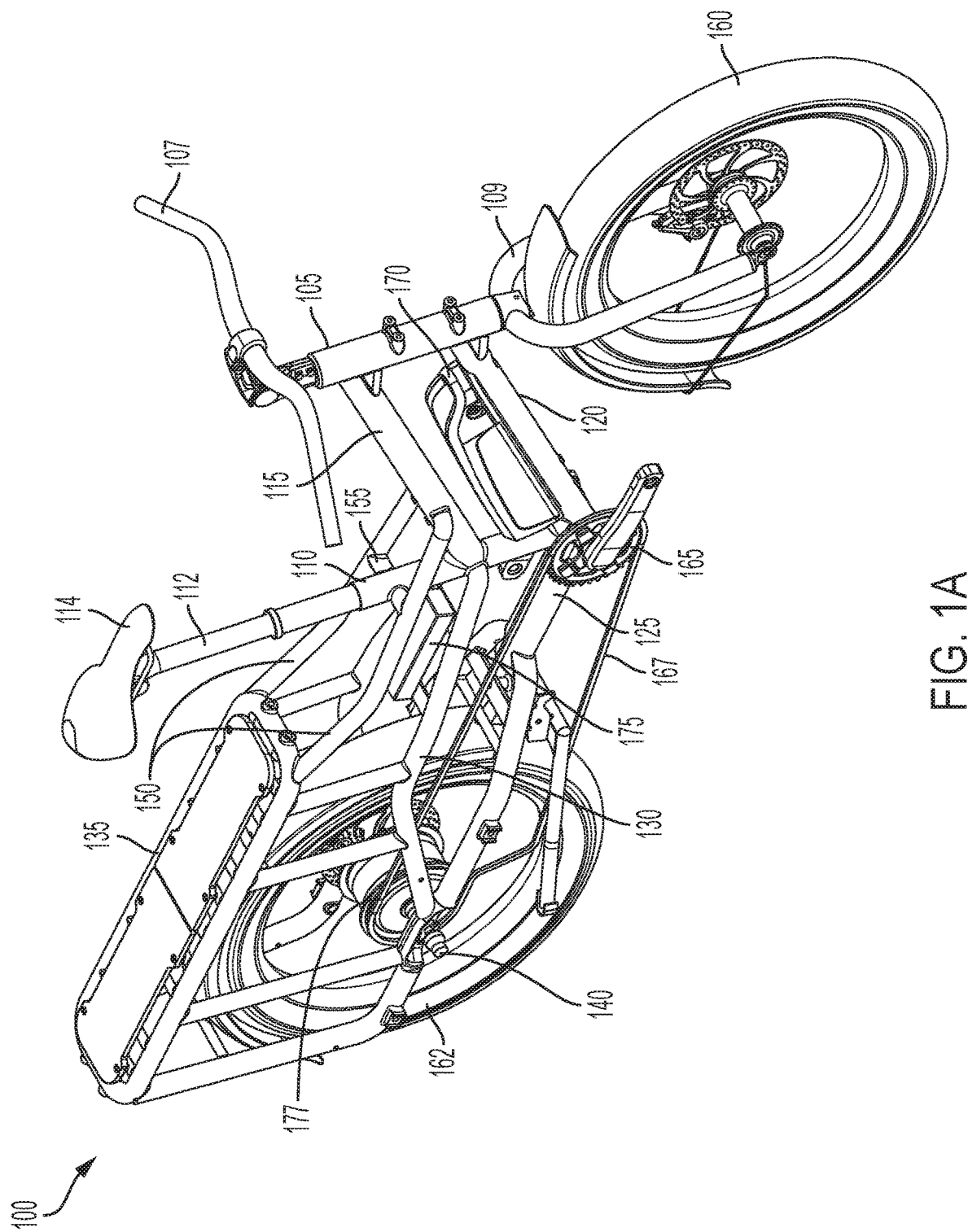
FIG. 1A is an isometric view of an electric cargo bike.

The drawings have not necessarily been drawn to scale. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

An electric bicycle having a bike frame configured to support loads placed on or between the front and rear of the bicycle is described. The bike frame, in some embodiments, includes cross members that connect a rear rack of the bicycle to a head tube of the bicycle via a seat tube of the bicycle. Via the multiple connection points, the cross members mitigate side to side movement, such as waggling, of the rear rack of the bicycle. For cargo bikes, such as a long-tail cargo bicycle carrying a heavy load on the rear rack, the mitigation or prevention of the side to side movement enables a smoother ride and reduces the wear and tear of the bicycle and its components, among other benefits.

The bike frame also includes a dropout assembly configured to carry loads from the front of the bike frame as well as loads from the rear rack of the bike frame. Each dropout assembly (or "dropout," "frame end," or "forkend") is configured to receive and be coupled to a chain stay and seat stay from the front end of the bike frame, as well as to one or more support tubes that vertically support the rear rack of the bike frame.

By coupling to the rear rack and the chain and seat stays, the dropout assemblies provide additional support for loads applied to the bike frame (e.g., cargo or passengers riding on the rear rack), while also providing a lowered frame height, and thus a resulting lowered center of gravity. In doing so, as well as in combination with the cross members of the bike frame, the dropout assemblies act to prevent loads applied vertically to the bicycle from affecting the operation of the bicycle, also reducing the wear and tear of the bicycle and its components, among other benefits.

In addition to the structural enhancements described herein, the bike frame, in some embodiments, includes mounting or attachment points that facilitate the attaching or mounting of multiple, different components or accessories to the electric bicycle. For example, the bike frame can include mount points that enable the attachment of foot pegs or a running board to the lower section of the rear rack of the bike frame (e.g., on the chain stays). In providing mount or attachment points that accommodate multiple different accessories, the bike frame is easily configurable for different uses (e.g., cargo delivery or passenger transport) and different sizes of riders, among other benefits.

While described herein with respect to a long-tail electric cargo bicycle, in some embodiments aspects of the bike frame described herein can be configured or utilized with other bicycles or cycles, such as non-electric cargo bicycles, mid-tail cargo bikes, and so on.

Various embodiments of the electric bicycle and/or bike frame will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of a Bike Frame for an Electric Cargo Bicycle

FIG. 1A depicts an electric bicycle 100 that incorporates many of the various features of the technology described herein. As depicted, the electric bicycle, or e-bike, is a long-tail cargo bike configured to be propelled either by human pedaling of the e-bike and/or via an electric motor that assists the human's pedal-power or propels the e-bike without pedaling (similar to a moped or scooter).

The electric bicycle 100 includes a head tube 105 that incorporates a front fork 109 and handlebars 107. A top tube 115 connects the head tube 105 to a seat tube 110, which is substantially parallel to the head tube 105. A down tube 120, parallel to the top tube 115, also connects the head tube 105 to the seat tube 110 at a bottom portion of the seat tube 110. A seat or saddle post 112 is positioned partially in the seat tube 110 and extends or protrudes outwardly from the seat tube 110. The seat post 112 supports a seat or saddle 114, upon which a rider sits on the bicycle 100.

Two chainstays 125 (or one chainstay with two arms) extend from the bottom portion of the seat tube 110 and each end at a dropout assembly 140 (or dropout or forkend) of the bike frame. Two seatstays 130 extend from a middle portion of the seat tube 110 (an area where the top tube 115 attaches to the seat tube 110) to the dropouts 140.

A rear rack 135 is positioned in the rear of the electric bicycle 100. The rear rack includes various support tubes or posts and is at least partially connected to and supported by the seatstays 130 and the dropouts 140. Two cross members 150, or support stays, rack stays, or additional seatstays, attach to the rear rack 135 and extend to the top tube 115. The cross members 150 extend around the seat tube 110, forming a space or opening defined by the cross members 150, the seat tube 110, and the top tube 115. Thus, in some embodiments, these supports, such as the cross members or rack stays, provide fore/aft and/or lateral stabilization for the frame.

Figure 1B:
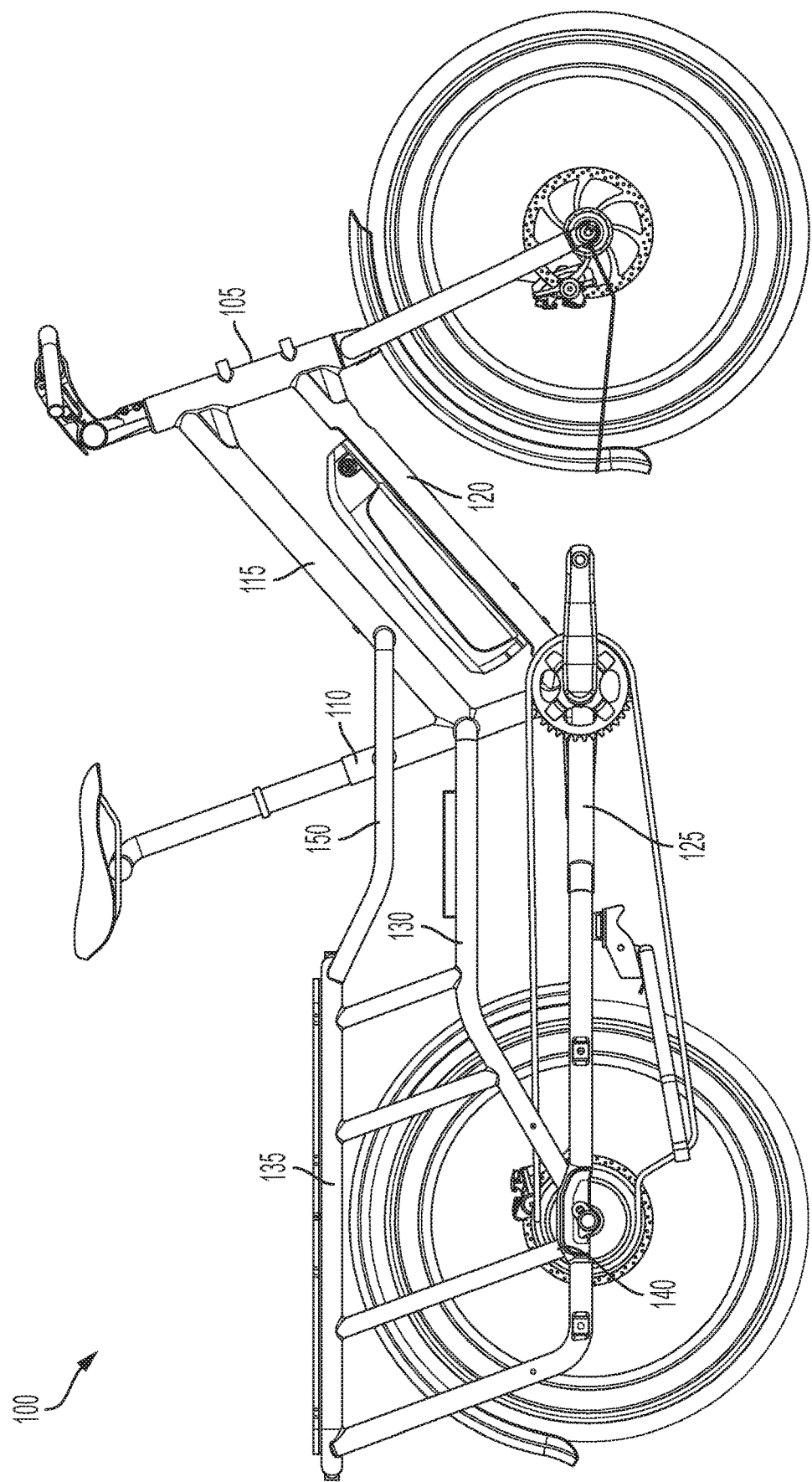
FIG. 1B is a front view of the electric cargo bike.

The cross members 150 do not directly attach to the seat tube 110. Instead, cross member posts 155 attach the cross members 150 to the seat post 110. Thus, the cross members 155 connect the rear rack 135 of the bicycle 100 to the head tube of the bicycle 100 via the seat tube 110 of the bicycle 100. Further details regarding the geometries of the different components of the frame are depicted in FIG. 1B.

As depicted, the cross members 150 include or have a curved shape or elbow shape, which allows the cross members 150 to attach to the rear rack 135 at a desirable height for the rear rack 135, while also extending and attaching to the top post 115 at a height that accommodates a rider being able to get on or step through the bicycle 100. Further, the cross members 150 are positioned such that they form a triangle shape within the frame, along with the seat tube 110 and the top tube 115.

Thus, in some embodiments, the bike frame, as configured, provides an extended head tube 105 length, in order to accommodate a down tube 120 mounted battery pack (or other components, described herein) while also providing a low or mid step-over height along with the placement of handlebars higher up on the bicycle 100 (e.g., for rider comfort and ergonomics).

As an example, the frame of the electric bicycle 100 can have the following dimensions: 27.2 cm for the head tube 105, 59.6 cm for the top tube 115, 59.2 cm for the down tube 120, 34.5 cm for the seat tube 110 (including 16.7 cm from the bottom of the seat tube to a center line of the head tube 115). Following the example, the cross members 150 have a length of 13.3 cm from the rear rack 135 to the curve, and 30.0 cm from the curve to the head tube 115. The curve of the cross members 150 is at an angle of 26 degrees. The height of the bicycle 100 from a center line of the dropout 140 to a center line of the rear rack 135 is 34.4 cm. Also, the distance from the rear rack 135 to the center line of the bottom of the seat tube 110 is 37.6 cm. In addition, the cross members are spaced apart (from center line to center line) by 14.6 cm at the rear rack 135, and 11.2 cm at a point where they surround the seat tube 110.

Referring back to FIG. 1A, the electric bicycle 100 also includes components common to bicycles, such as a front wheel 160 and rear wheel 162 that support the frame of the bicycle 100, a crankset 165 (that supports pedals, not shown), and a chain 167 that extends from the crankset to a rear axle of the rear wheel 162.

In some embodiments, the electric bicycle 100 includes and facilitates use of wheels/tires (e.g., wheels 160, 162) having a 22" rim and/or 3" balloon tires. Thus, the bike frame, having the cross members 150 and configuration of tubes as described, enables the use of smaller wheels/tires (e.g., 22 inches), providing enhanced wheel strength, a lowered center of gravity for the bicycle 100, pinch flat reduction, enhanced rider comfort, and other benefits.

The electric bicycle 100 also includes a battery pack 170 positioned and/or mounted to the down tube 120, a controller 175 mounted to the seatstays 130, and an electric motor 177 (e.g., a hub motor) mounted to the rear wheel. During operation of the electric bicycle 100, the battery pack 170 provides power to the electric motor 177, which propels the bicycle under control of the controller 175.

In addition to the components depicted in FIGS. 1A and 1B, the electric bicycle can include other components not shown, such as pedals, brakes and braking systems, various accessories, fenders, various types of rims, tires, or wheels, integrated locks or locking systems, lights and reflectors, bells or other audible alert systems, GPS, screens, and/or other user interfaces or display devices, and so on.

As described herein, the cross members 150 attach to the rear rack 135, seat tube 110, and top tube 115 such that an opening is formed within the bike frame to accommodate accessories or other devices to be attached to the frame.

Figure 2:
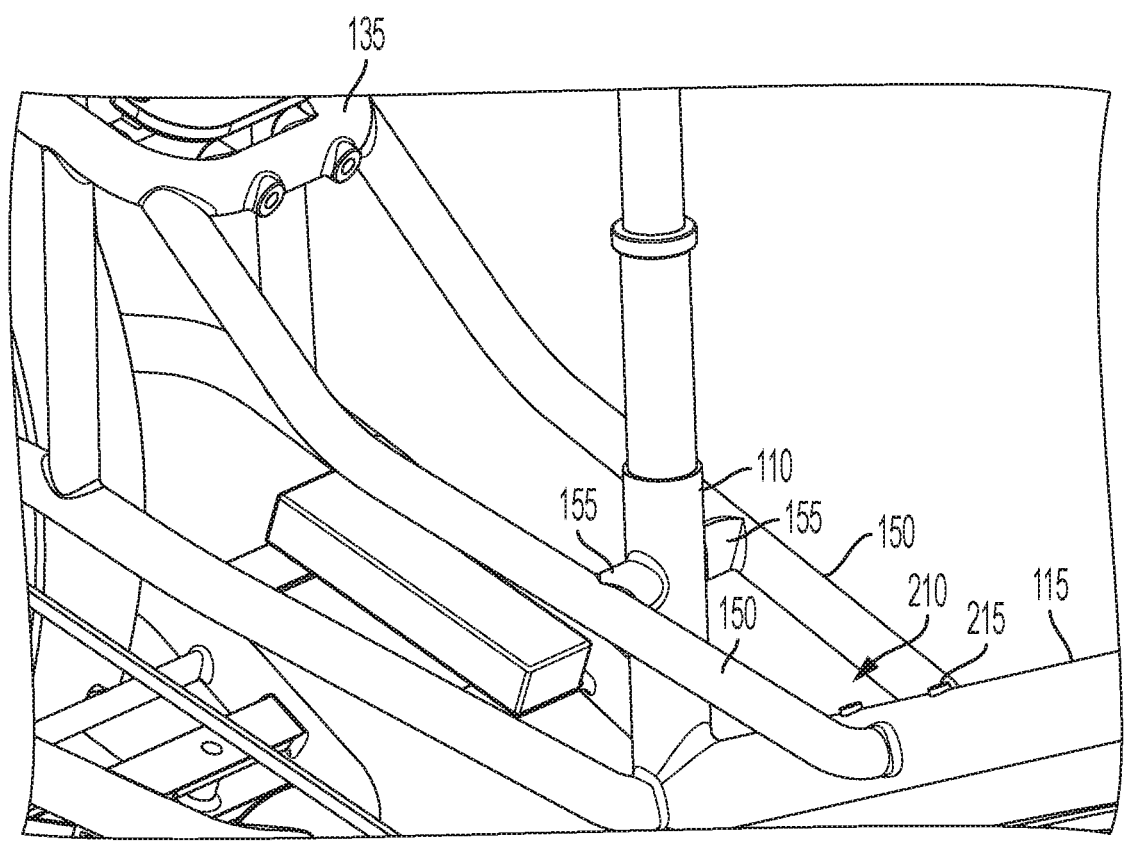
FIG. 2 is an isometric view of a portion of the bike frame of the electric cargo bike.

FIG. 2 presents a closeup view of a portion of the bike frame where the cross members 150 form an opening 210 within the frame. The opening 210 is formed between the seat tube 110, the cross members 150, the cross member posts 155, and the top tube 115. The top tube 115 includes mounting or attachment points 215 that enable various accessories to be mounted to the top tube 115, such that they sit at least partially within the opening 210.

As described herein, the accessories can include water bottles and cages, locks, small carrying cases, other electronic components or controllers, and so on. Positioning the accessories at least partially within the opening 210 can protect the accessories from damage due to accidents, locking up the bicycle 100 in a rack, or other scenarios where the frame of the bicycle 100 prevents an accessory from being damaged or otherwise contacted.

As described herein, in some embodiments, the electric bicycle 100 includes dropout assemblies 140 configured and/or designed to attach to multiple posts of the bicycle 100, including posts that support the rear rack 135. FIG. 3A depicts a rear portion of the bike frame of the electric bicycle 100, including the rear rack 135 and one of the dropout assemblies 140.

The dropout assembly 140, as described herein, is attached to and supports, at least partially, the chainstay 125 and the seatstay 130. The dropout 140, which is configured as a horizontal dropout, receives the hub 304 of the rear wheel 162 via a slot 307. The dropout 140 is formed with a top surface or portion 310 or other similar attachment surface configured to have a geometry that facilitates the attachment of the chainstay 125, the seatstay 130, and one or more vertical support posts of the rear rack 135.

Figure 3B:
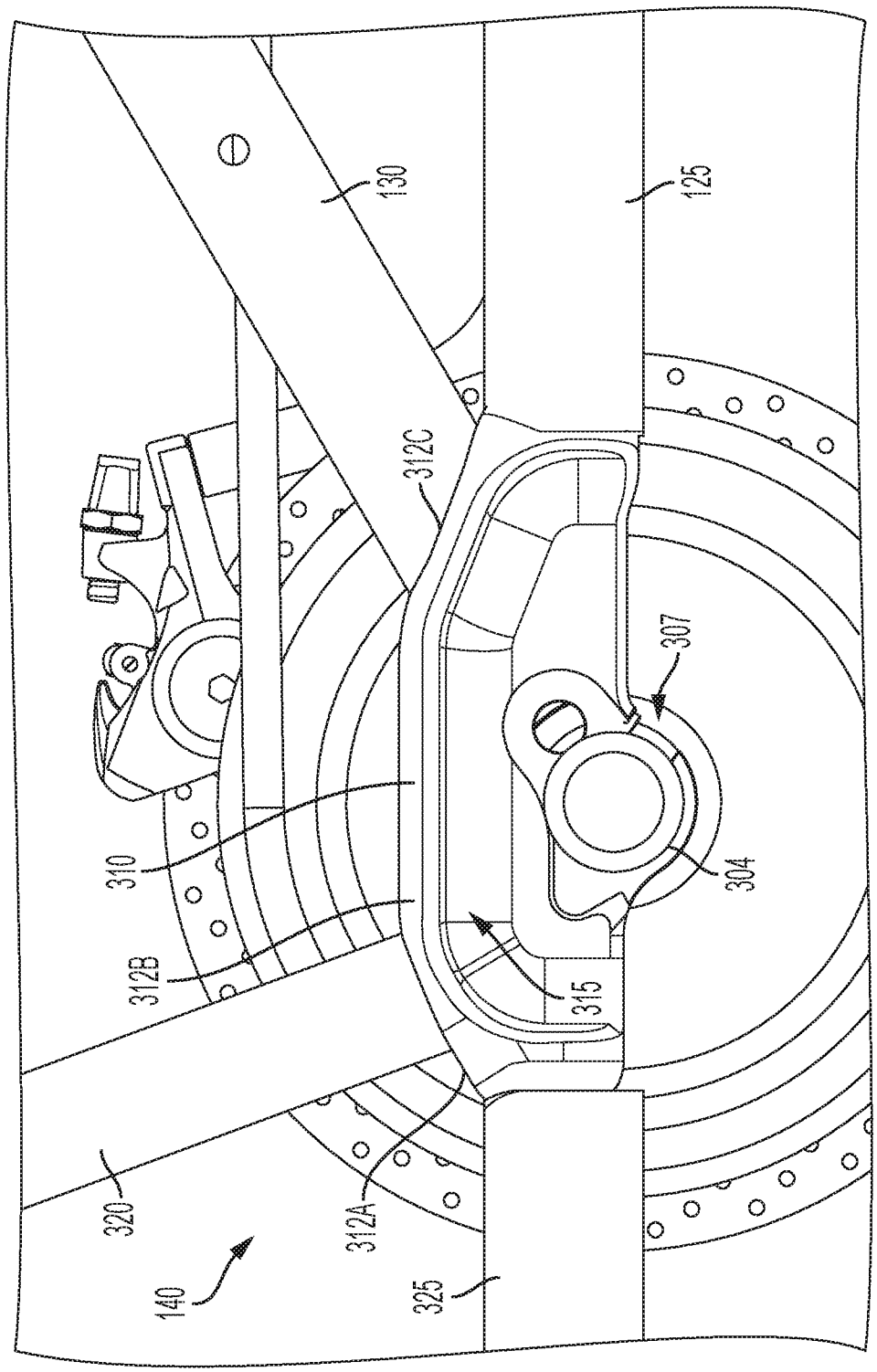
FIG. 3B is a closeup view of a drop out portion of the bike frame of the electric cargo bike.

For example, as depicted in FIG. 3B, the top portion 310 of the dropout 140 has three attachment planes 312A-C, enabling a first rack support post 320, a second rack support post 325, the chainstay 125, and the seatstay 130 to attach, via welded attachment points, to the dropout 140. The top portion 310 can be configured in a variety of other geometries in order to accommodate the attachment of posts of the frame.

Further, the dropout assembly 140 can have a variety of cross-sectional geometries that assist in carrying or supporting loads placed onto the rear rack 135 of the bicycle 100. For example, the top portion 310 of the dropout can have an I-beam cross-sectional geometry 315, with a lip that extends downward from the top surface of the dropout 140.

As depicted, the dropout assembly 140 also includes a large flat section that can secure a torque arm and/or torque arm washer to an outer surface of the dropout 140, enhancing the support of the motor 177 (such as a hub motor) within the frame. Thus, the large flat portion (having various depressions therein), disposed on an outer surface of the dropout assembly 140, is configured to accommodate and enhance a torque arm or torque arm washer being secured to the dropout assembly 140.

Referring back to FIG. 3A, the rear rack 135 supports a deck 340 or other cargo carrying surfaces. Although not shown, the rear rack 135 is configured to support one or more seat pads, one or more seats (such as child bike seats), and/or combinations of seat pads, seats, or deck surfaces. Further, the rear rack includes mounting or attachment points 350, which are configured to accommodate the attachment of multiple, different accessories, as is described herein.

In addition to the vertical support posts or tubes 320, 325, which extend from the top of the rear rack 135 and attach to the dropout 140 via the top surface 310, additional support posts or tubes 330 and 335 are positioned between the rear rack and the seatstay 130, and function to support the rear rack 135.

Thus, the rear rack 135, in various embodiments, is supported by posts or tubes that extend downward from the top portion of the rear rack 135 to various support points, including different points on the top surface 310 of the dropout assembly 140, as well as different points along the seatstay 130.

As described herein, the bike frame of the electric bicycle 100 provides structural support in both the vertical and horizontal axes of the bicycle 100, while providing a lowered profile to accommodate many different riders. In doing so, the bike frame can mitigate or reduce side to side movement of the rear rack 135, especially when the rack 135 is loaded with heavy cargo or multiple passengers. Further, the bike frame can spread heavy loads placed onto the rear rack 135 across multiple different support tubes or posts, carrying those loads at different section of the bike frame, including the dropout assemblies 140.

Figure 4:
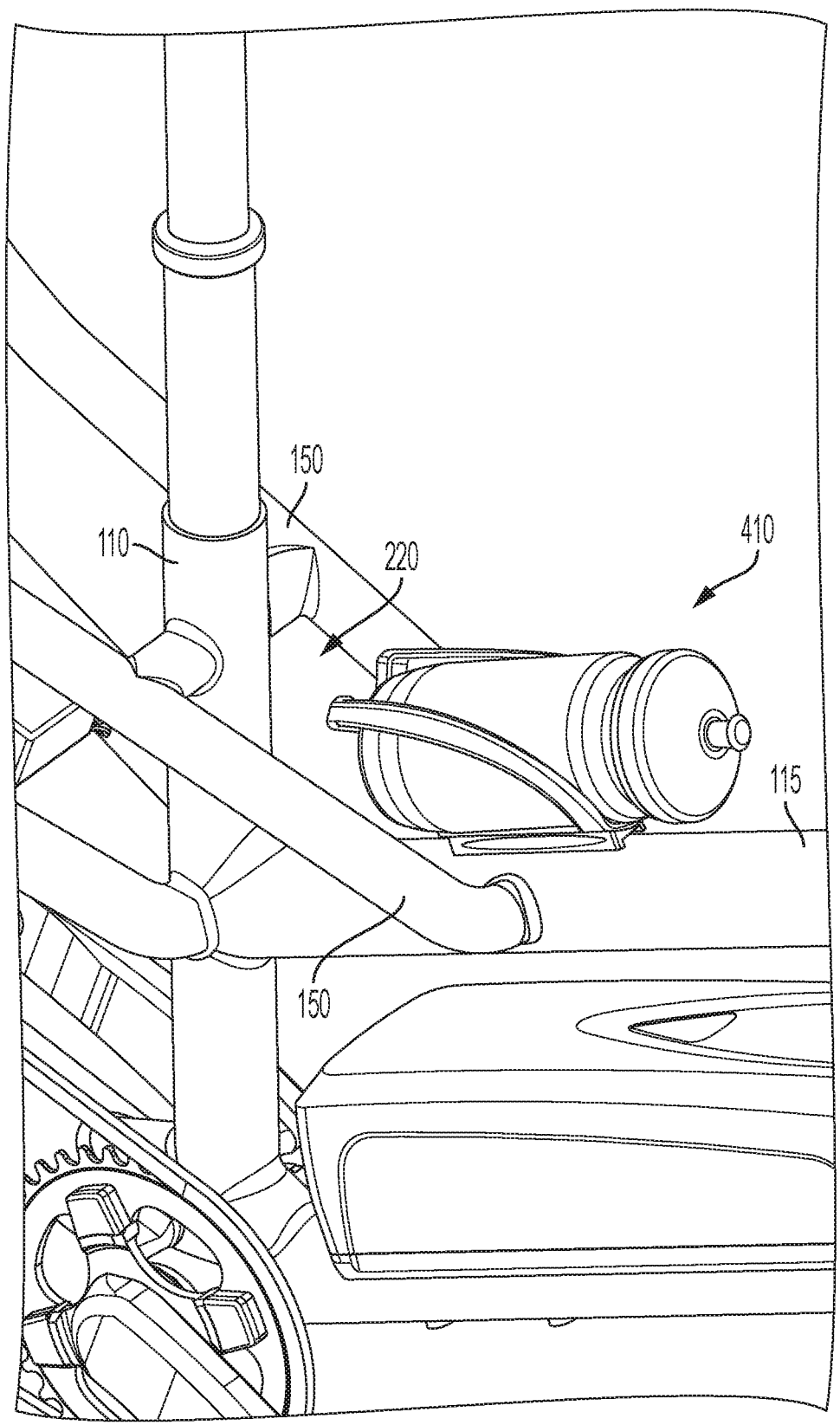
FIG. 4 is a closeup view of an accessory mounted to the bike frame of the electric cargo bike.

In addition, the geometry of the cross members 150 enable the bicycle 100 to accommodate the attachment of accessories within openings, such as opening 210, of the frame. As described herein and depicted in FIG. 4, the bike frame, via attachment points 215, can support and/or attach to a water bottle cage (and water bottle) 410 within (or partially within) the opening 210 of the bike frame. As attached, a rider of the bicycle 100 can access the water bottle 410 when riding the bike and can also step through the bike frame when getting on or off the bicycle 100, due to the lowered profile of the bicycle 100.

Examples of Flexible Mounting Points

Figure 5A:
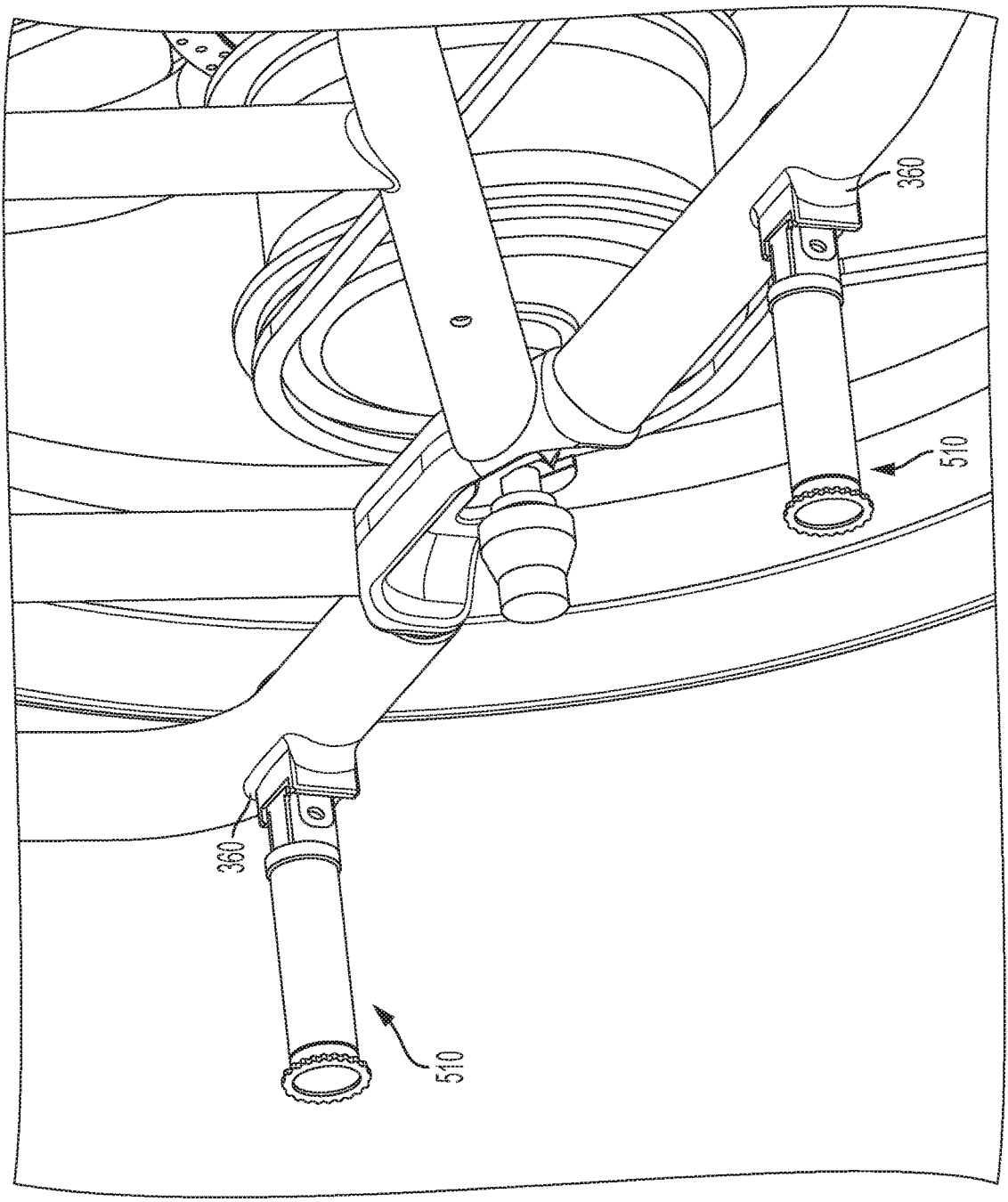
FIG. 5A is a closeup view of foot pegs mounted to the bike frame of the electric cargo bike.

As described herein, the electric bicycle 100 provides flexible mounting or attachment points that enable the bicycle to mount and/or support multiple, different accessories at the same attachment points. FIG. 5A depicts foot pegs 510 mounted to the bike frame of the electric cargo bike.

Figure 5B:
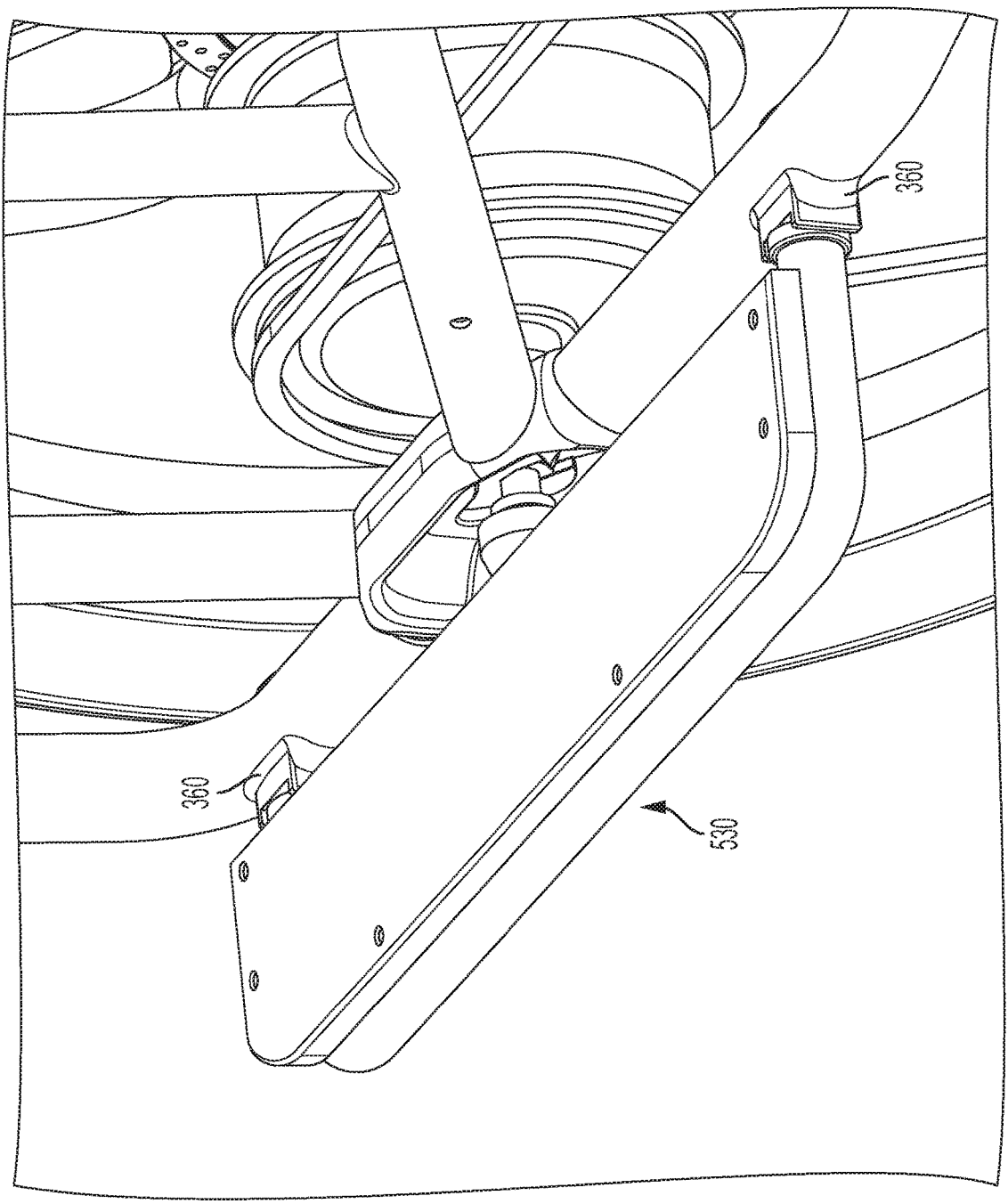
FIG. 5B is a closeup view of a running board mounted to the bike frame of the electric cargo bike.

The foot pegs 510 are mounted via the attachment points 360 of the lower portion of the rear rack 135. As described herein, the attachment points 360 are configured to accommodate additional accessories, such as a running board 530, depicted in FIG. 5B. The running board mounts to the bike via the attachment points 360, using similar mounting components as the foot pegs 360. Thus, the attachment points 360, and the different accessories (e.g., the foot pegs 510 and running board 530) are configured to be interchangeable with one another, providing the bicycle 100 with a simple, flexible mechanism for configuring to meet the needs of riders.

In some cases, mounting hardware can extend inwardly and affect operation of the chain 167 (shown in FIG. 1). Thus, as shown in FIG. 5C, the mounting points include a protruding portion 540 that interfaces with the different accessories (e.g., running board 530) and a flush portion 545, which is adapted to not extend outside of the rack post, in order to avoid contacting or interfering with the chain 167.

In addition to the flexible mounting points 360 at the lower or bottom portion of the rear rack 135, the rear rack 135 can also include the flexible mounting points 350 located on the front and back portions of the rack. These mounting points 350 can accommodate different accessories, such as accessories useful for transporting children or other passengers. Further, the mounting points 350 can facilitate the attachment of trailers, such as trailers configured to carry or transport additional cargo.

Figure 6A:
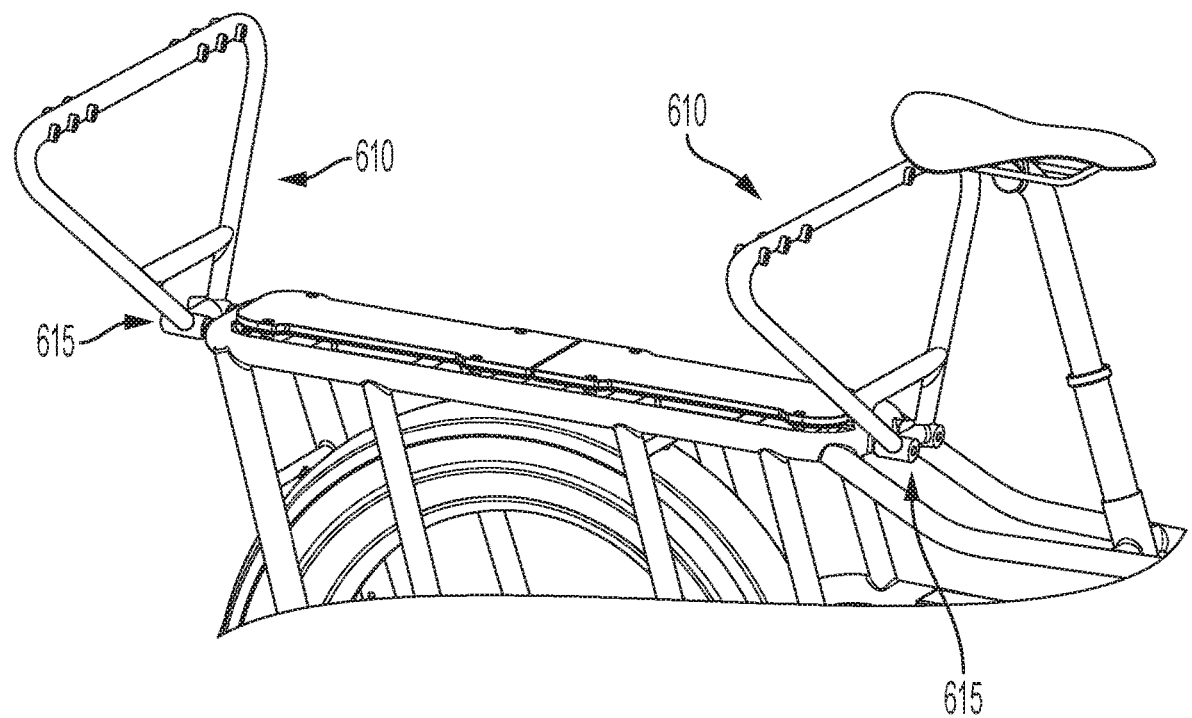
FIG. 6A is a closeup view of deckhands mounted to a rear rack of the electric cargo bike.

For example, FIG. 6A depicts deckhands 610 being mounted to the rear rack 135 of the bicycle 100. The deckhands can be mounted to the front or back of the rear rack 135 via mounting hardware 615 attached to or fixed at the mounting points 350, and function to provide a passenger with a place to hold onto when riding atop the rear rack 135. Further, the deckhands 610 can facilitate the tying down or securement of cargo to the deck 340 of the rear rack 135.

Figure 6B:
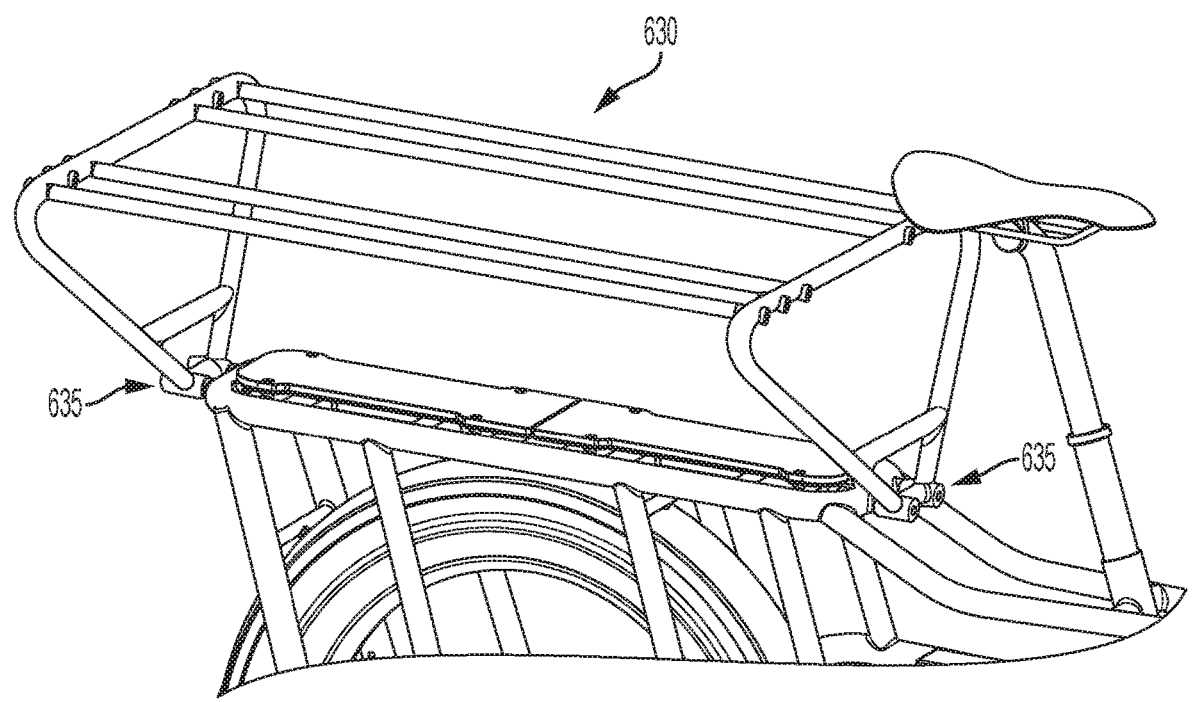
FIG. 6B is a closeup view of a caboose accessory mounted to the rear rack of the electric cargo bike.
Figure 6C:
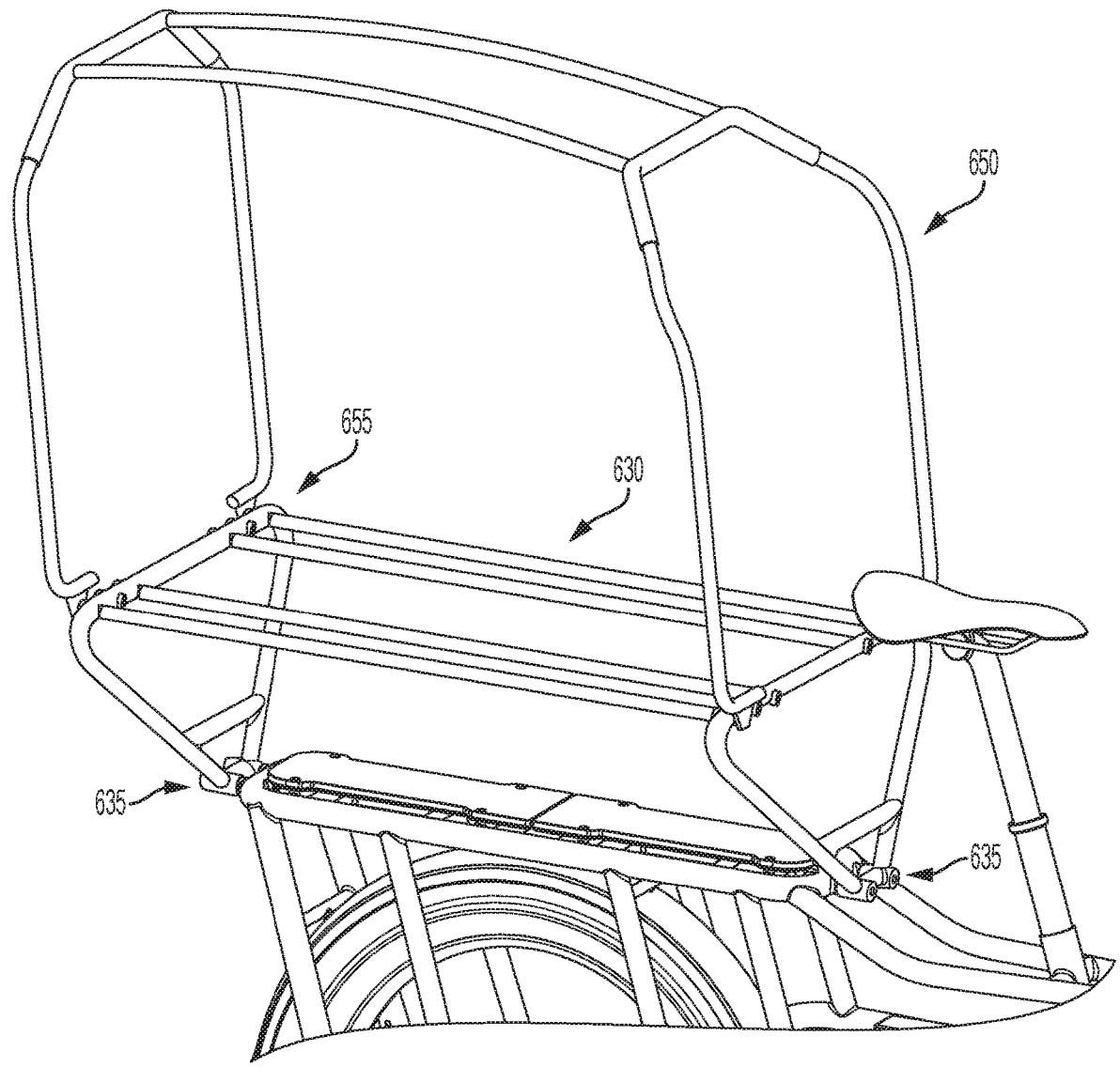
FIG. 6C is a closeup view of a caboose accessory with wagon attachment mounted to the rear rack of the electric cargo bike.

As another example, FIG. 6B depicts a caboose accessory 630 mounted to the rear rack 135. Via mounting hardware 635 similar to the mounting hardware 615 for the deckhands 610, the caboose accessory 630 can be positioned and secured to the rear rack 135 via the mounting points 350. Additionally, as shown in FIG. 6C, a wagon attachment 650 can be fixed, via clips or other fasteners 655, to the caboose 630 attached to the rear rack 135.

Thus, in some embodiments, the rear rack 135 of the bicycle 100 includes various flexible mounting points configured to carry, support, affix, attach, or otherwise position various accessories to a cargo e-bike, enabling the e-bike to provide flexibility with respect to its use and functionality, among other benefits.

Example Embodiments of the Bike Frame and/or Electric Bicycle

As described herein, the electric bicycle and/or bike frame may include various geometries or configurations, including configurations that include cross members extending horizontally across the frame and configurations that include a dropout assembly supporting vertical support posts or tubes of a rear rack of an e-bike.

In some embodiments, a frame for an electric bicycle includes a head tube configured to support handlebars and a front fork, and a top tube that extends from the head tube to the seat tube, a down tube that extends from the head tube to the seat tube. The frame also includes a rear rack that is configured to support a passenger or cargo placed onto the electric bicycle and two cross members that extend from the rear rack to the top tube, where each cross member extends past the seat tube to the top tube, as well as two cross member posts that each attach a cross member to the seat tube.

In some cases, the cross members extend from the rear rack to the top tube at an outside position and/or on opposite/opposing sides of the seat tube to form an opening between the seat tube, the top tube, and the cross members. Further, the two cross members can be welded to the top tube, the rear rack, and the cross member posts, where cross member posts are welded to the seat tube.

In some cases, the cross members attach to the top tube such that the top tube, the seat tube, and each of the cross members form a triangle shaped configuration of the frame. Also, each of the cross members can have a curved shape when extended from the rear rack to the top tube.

In some cases, the top tube includes mounting points positioned to mount an accessory to the frame at least partially between the cross members, such as in an opening created between the cross members.

In some cases, the rear rack includes mounting points configured to interchangeably mount foot pegs or a running board to the frame and/or includes a deck and mounting points configured to interchangeably mount deckhands or a caboose accessory to the frame.

In some embodiments, the frame for a cargo bike includes a head tube, a seat tube, a top tube, a rear rack, and two cross members that extend from the rear rack to the top tube without directly attaching to the seat tube. Instead, the frame includes cross member posts that each attach a cross member to the seat tube.

In some cases, the cross members extend from the rear rack to the top tube at an outside position of the seat tube to form an opening between the seat tube, the top tube, and the cross members.

In some embodiments, a dropout assembly for an electric cargo bike includes a horizontal slot that receives a rear wheel hub of a rear wheel of the electric cargo bike and a top support portion. The top support portion can support a chainstay that extends from a seat tube of the electric cargo bike to the dropout assembly, a seatstay that extends from the seat tube of the electric cargo bike to the dropout assembly, and one or more vertical support posts that attach to the top support portion of the dropout assembly and extend between the dropout assembly and a rear rack of the electric cargo bike.

In some cases, the top support portion includes two or more planar support surfaces, such as three planar support surfaces, and the cross-sectional geometry of the top support portion is an I-beam geometry. The top support portion can have a geometry configured to facilitate welding of the chainstay, the seatstay, and the one or more vertical support posts to the dropout assembly. Further, the chainstay and the seatstay can attach to the top support portion at a front section of the top support portion and the one or more vertical support posts attach to the top support portion at a back section of the top support portion.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the electric bike and bike frame may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. A frame for an electric bicycle, the frame comprising:
   a head tube configured to support handlebars and a front fork;

a seat tube configured to support a saddle post that holds a saddle and is placed at least partially within the seat tube;

a top tube that extends from the head tube to the seat tube;

a down tube that extends from the head tube to the seat tube;

a rear rack that is configured to support a passenger or cargo placed onto the electric bicycle;

two cross members that extend from the rear rack to the top tube,
wherein each cross member extends past the seat tube to the top tube; and two cross member posts,
wherein each cross member post attaches a cross member to the seat tube;

a dropout assembly configured to support a rear wheel hub of a rear wheel of the electric bicycle;

a chainstay that extends from the seat tube to the dropout assembly;

a seatstay that extends from the seat tube to the dropout assembly; and one or more vertical support posts that attach to the dropout assembly and extend between the dropout assembly and the rear rack.

2. The frame of claim 1, wherein the cross members extend from the rear rack to the top tube at an outside position of the seat tube to form an opening between the seat tube, the top tube, and the cross members.

3. The frame of claim 1, wherein the two cross members are welded to the top tube, the rear rack, and the cross member posts; and wherein the cross member posts are welded to the seat tube.

4. The frame of claim 1, wherein the cross members attach to the top tube such that the top tube, the seat tube, and the cross members form a triangle in a horizontal plane of the frame.

5. The frame of claim 1, wherein each of the cross members has a curve between the rear rack to the top tube.

6. The frame of claim 1, wherein the top tube includes mounting points positioned to mount an accessory to the frame at least partially between the cross members.

7. The frame of claim 1, wherein the rear rack includes mounting points configured to interchangeably mount foot pegs or a running board to the frame.

8. The frame of claim 1, wherein the rear rack includes a deck and mounting points configured to interchangeably mount deckhands or a caboose accessory to the frame.

9. A dropout assembly for an electric cargo bike, the dropout assembly comprising:

a horizontal slot that receives a rear wheel hub of a rear wheel of the electric cargo bike;

a top support portion having a cross-sectional geometry that includes an I-beam shape having a lip that extends away from the top support portion,
wherein the top support portion is configured to support:

a chainstay that extends from a seat tube of the electric cargo bike to the dropout assembly; and a seatstay that extends from the seat tube of the electric cargo bike to the dropout assembly; and one or more vertical support posts that attach to the top support portion of the dropout assembly and extend between the dropout assembly and a rear rack of the electric cargo bike.

10. The dropout assembly of claim 9, wherein the top support portion is configured to support two vertical support posts that extend between the dropout assembly and the rear rack of the electric cargo bike.

11. The dropout assembly of claim 9, wherein the top support portion includes two or more planar support surfaces, and wherein the dropout assembly includes a flat portion, disposed on an outer surface of the dropout assembly and configured to accommodate a torque arm or torque arm washer secured to the dropout assembly.

12. The dropout assembly of claim 9, wherein the top support portion includes three planar support surfaces.

13. The dropout assembly of claim 9, wherein the top support portion has a three planar geometry angled to facilitate welding of the chainstay, the seatstay, and the one or more vertical support posts to the dropout assembly.

14. The dropout assembly of claim 9, wherein the chainstay and the seatstay attach to the top support portion at a front section of the top support portion and the one or more vertical support posts attach to the top support portion at a back section of the top support portion.

15. The dropout assembly of claim 9, wherein the electric cargo bike is a long-tail cargo bike.

16. A frame for a cargo bike, the frame comprising:
a head tube;
a seat tube;
a top tube; a
a rear rack; and
two cross members that extend from the rear rack to the top tube,
wherein each cross member extends past the seat tube to the top tube without directly attaching to the seat tube, and
wherein the cross members extend from the rear rack to the top tube on opposite sides of the seat tube to form an opening between the seat tube, the top tube, and the cross members.

17. The frame of claim 16, further comprising:
two cross member posts,
wherein each cross member post attaches one cross member to the seat tube.

18. The frame of claim 16, wherein the top tube includes mounting points positioned to mount an accessory to the frame at least partially within the opening between the seat tube, the top tube, and the cross members.

19. The frame of claim 16, wherein each of the cross members has a curve between the rear rack to the top tube.

* * * * *